No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)
(No Model.) 7 Sheets—Sheet 1.

No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)
(No Model.) 7 Sheets—Sheet 2.

No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)

(No Model.) 7 Sheets—Sheet 3.

No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)

(No Model.) 7 Sheets—Sheet 4.

No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)

(No Model.) 7 Sheets—Sheet 5.

No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)
(No Model.) 7 Sheets—Sheet 6.

No. 699,575. Patented May 6, 1902.
H. A. ROWLAND, Dec'd.
H. H. ROWLAND, Administratrix.
TELEGRAPHIC PAGE PRINTER.
(Application filed July 24, 1901.)

(No Model.) 7 Sheets—Sheet 7.

UNITED STATES PATENT OFFICE.

HENRIETTA H. ROWLAND, OF BALTIMORE, MARYLAND, ADMINISTRATRIX OF HENRY A. ROWLAND, DECEASED, ASSIGNOR TO ROWLAND TELEGRAPHIC COMPANY, OF BALTIMORE, MARYLAND, A CORPORATION OF NEW JERSEY.

TELEGRAPHIC PAGE-PRINTER.

SPECIFICATION forming part of Letters Patent No. 699,575, dated May 6, 1902.

Application filed July 24, 1901. Serial No. 69,525. (No model.)

*To all whom it may concern:*

Be it known that HENRY A. ROWLAND, deceased, late a citizen of the United States, and a resident of Baltimore city, in the State of Maryland, did invent certain new and useful Improvements in Telegraphic Page-Printers, (Case K,) of which the following is a full, clear, and exact specification, such as will enable any one skilled in the art to manufacture and use the same.

This invention relates to improvements in page-printing machines for electric telegraphs, and has reference especially to certain improvements upon the carriage-shifting mechanism shown and described in the patent application of Henry A. Rowland, Serial No. 19,070, filed June 14, 1900, and to this end comprises the novel combination and arrangement of parts substantially as hereinafter more fully described, claimed, and shown in the accompanying drawings, in which—

Fig. 2, a similar view with the paper removed.

Similar letters and numerals refer to similar parts throughout the several views.

A represents a printer-carriage which is suspended by hangers $a$ from a sleeve $a'$, adapted to slide longitudinally on a preferably triangular shaft $a^2$ and to be rotated with said shaft by the ratchet-and-pawl mechanism $a^3$, operated by the magnet $A^2$, all substantially as fully shown and described in the patent application, Serial No. 19,070, above referred to. The hangers $a$ are loosely journaled, as at $a^5$, upon the said sleeve $a'$, so that the said sleeve may rotate with the shaft $a^2$ without tending to rotate the carriage. A roughened paper-roller $a^6$ is mounted fast upon the sleeve $a'$ and engages a second paper-roller $a^7$, mounted upon the shaft $a^8$, secured at its ends in the uprights $a^9$ of the carriage, also as fully described and shown in said patent application.

The rollers $a^6$ and $a^7$ engage the paper A' upon which the characters are to be printed at or near its center, and the paper is thus held beneath a continuously-rotating type-wheel F. The paper being carried in this manner in the carriage is fed up from one line to the next by means of the ratchet-and-pawl mechanism $a^3$, operated by the magnet $A^2$, and the paper is fed up from one blank sheet to the next, as fully described and shown in the patent application above referred to, by means of the blank-paper-feed mechanism $A^5$, which forms no part of the present invention and need not be here fully described.

Figures 5, 6:
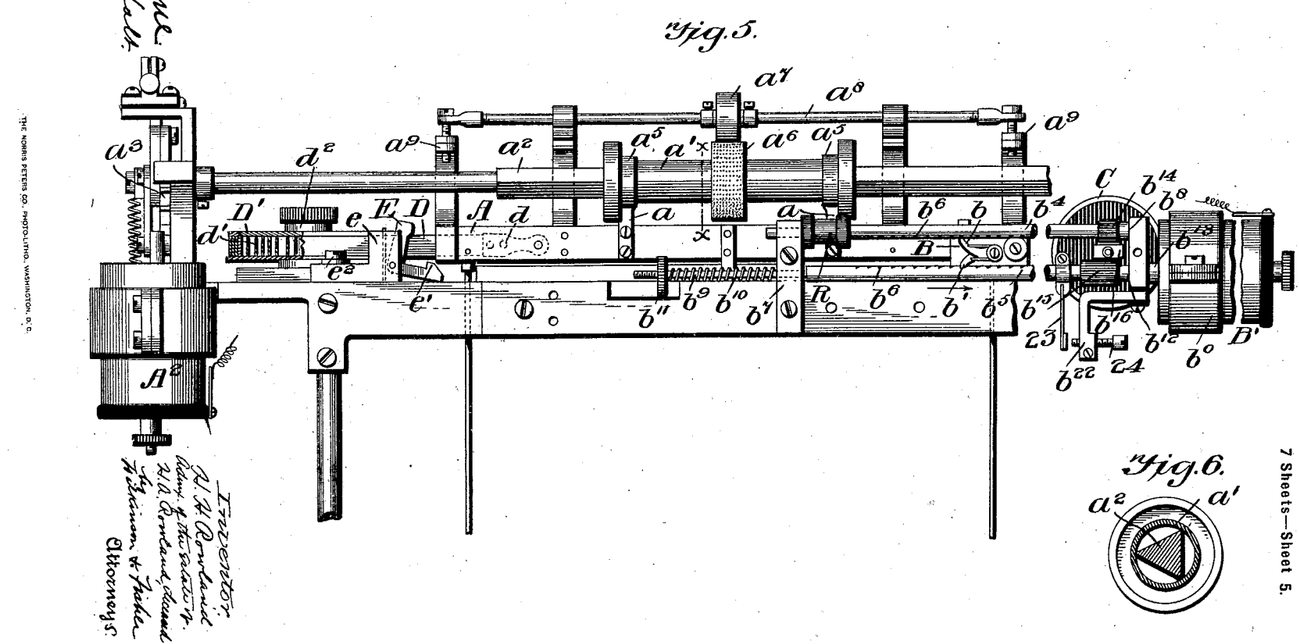
Fig. 5, an enlarged detail view of the printer-carriage and its shifting mechanism.
Fig. 6 represents a section through the carriage-supporting sleeve, taken along the line $x$ $x$ of Fig 5.

The improved mechanism for imparting travel to the carriage comprises, among other parts, a plate B, secured fast to the frame of the printer-carriage. Upon one face of this plate are mounted two pawls $b$ and $b'$, pivoted upon a common center $b^2$. These pawls are oppositely disposed and are forced outward in opposite directions by the spring $b^3$. These pawls are normally held between two shifting rods $b^4$ and $b^5$, each provided with a row of notches or teeth $b^6$. These pawls are so mounted relative to the rods $b^4$ and $b^5$ that the pawl $b$ normally engages the teeth of the rod $b^4$ and the pawl $b'$ the teeth of the rod $b^5$. The rod $b^5$ is rotatably mounted at one end in an upright $b^7$, made fast to the frame of the printer, and at the other in the printer-frame, as at $b^8$. This rod, however, is capable only of rotatable movement around its longitudinal axis. The rod $b^5$ is also rotatably mounted in the upright $b^7$, but is reduced in diameter, preferably, before passing through said upright and extends some distance beyond the same, as shown at $b^9$, where it is provided with a coil-spring $b^{10}$, which is held between the upright $b^7$ and an adjustable nut $b^{11}$ upon the end of the rod $b^5$. The other end of this rod $b^5$ is rotatably mounted in and passes through the frame of the printer, as at $b^{12}$, where it is secured to a plunger $b^{13}$ of a suitable magnet, preferably a pot-magnet, substantially the same in structure as the iron-clad magnet shown and described in the patent application above referred to, the said magnet being held fast in the printer-frame by the split collar $b^0$. It will therefore be seen that each time the magnet B' is energized and sucks in its core $b^{13}$ a quick forward movement of limited extent will be imparted to the rod $b^5$ in the direction of the arrow shown in Fig. 5. Then, as the pawl $b'$ engages the teeth of the rod $b^5$ this forward movement of the said rod will impart a like movement to the plate B to which said pawl is pivoted. The said plate being secured fast to the printer-carriage, the latter will therefore be carried forward a distance corresponding to that of the rod $b^5$, this distance being limited with respect to the distance between the teeth of the said rods, so that for each forward stroke of the rod $b^5$ the pawls $b$ and $b'$ will pass from one of the teeth of the said rods to the next.

Figure 1:
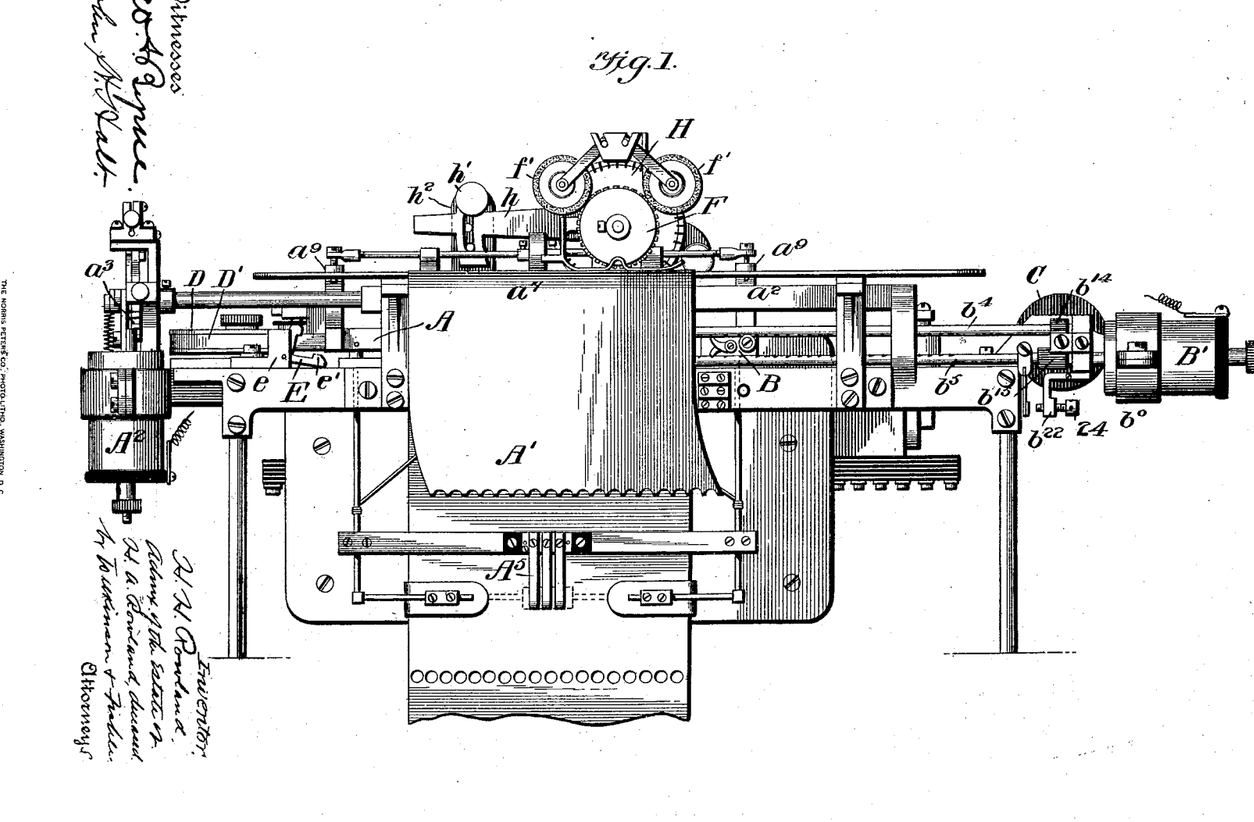
Figure 1 represents a front elevation of the printer with the paper in position.
Figure 3:
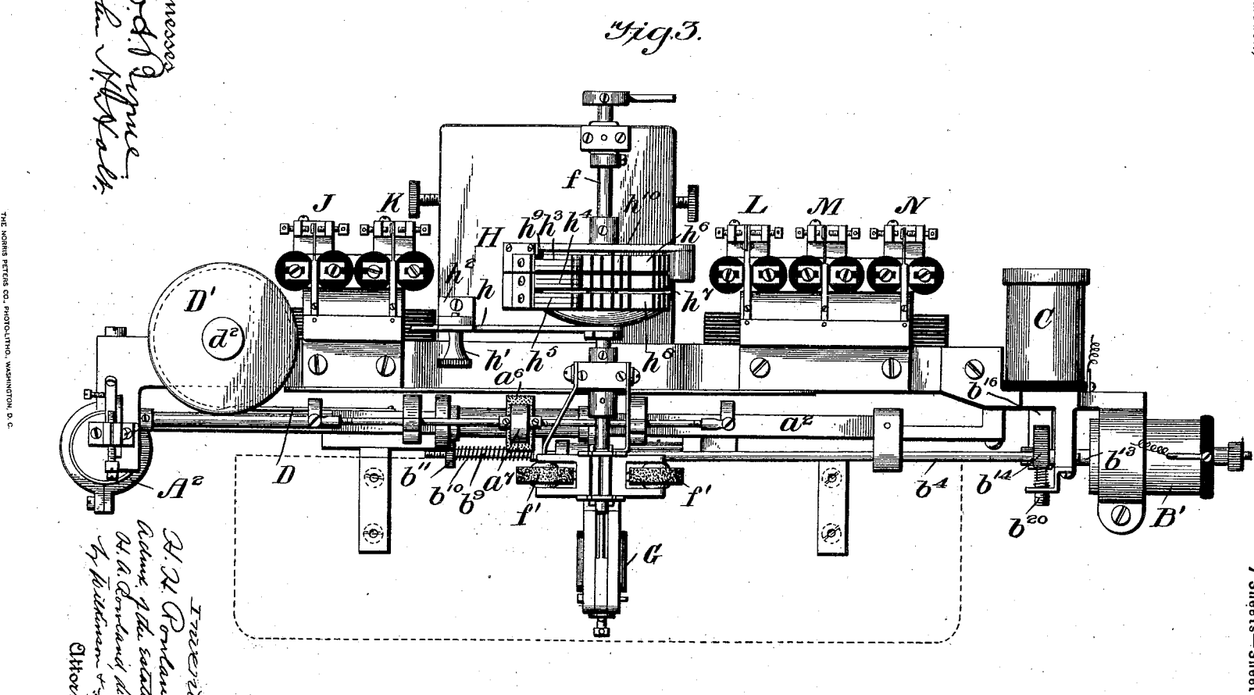
Fig. 3, a top plan view of the printer.
Figure 4:
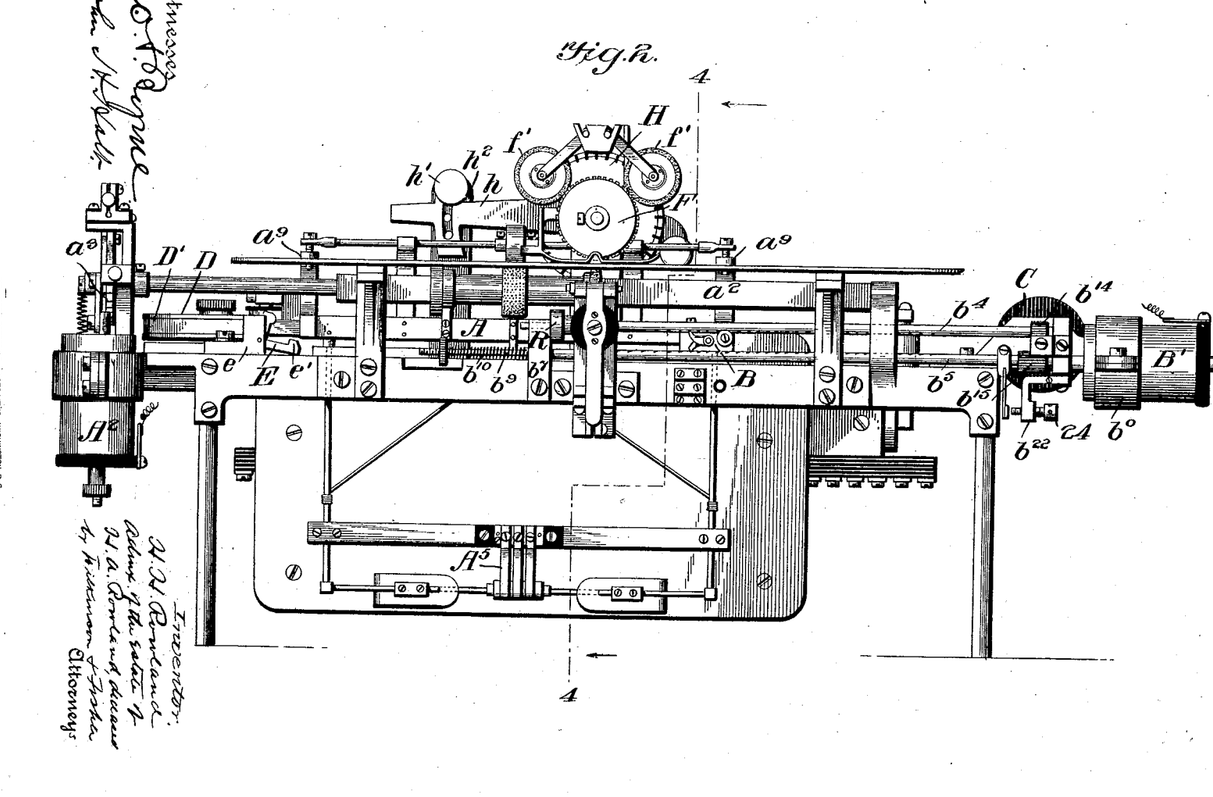
Fig. 4, a section along the line 4 4 of Fig. 2 and looking in the direction of the arrow.

When the magnet B' becomes deënergized, the rod $b^5$ will be quickly returned to its initial position by the spring $b^{10}$. This, however, will not carry the plate B back, since it will be held in the position to which it was last carried by the pawl $b'$ engaging the teeth of the rod $b^4$. In this manner by successively energizing and deënergizing the magnet B' a succession of quick forward and return movements are imparted to the rod $b^5$, which imparts a forward step-by-step movement to the plate B, and hence to the printer-carriage, to which said plate is secured. This step-by-step movement may be imparted to the said carriage either automatically after the printing of each character, and thus forming the spaces between the characters and feeding the paper step by step from right to left, as shown in Fig. 1, beneath the type-wheel, or this step-by-step movement may be imparted to the said carriage by energizing the magnet B' at will, as will hereinafter be more fully described.

Figure 7:
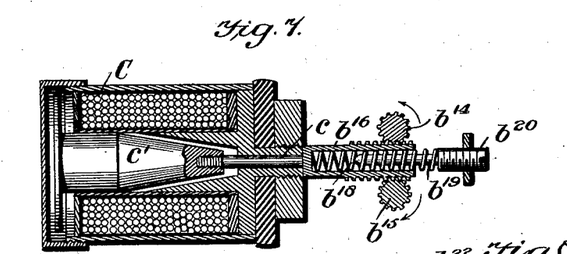
Fig. 7 is an enlarged central vertical section of the magnet for operating the carriage released and return mechanism.
Figure 10:
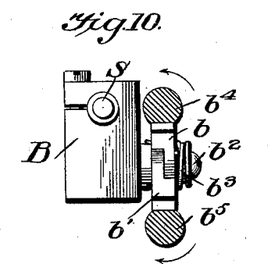
Fig. 10 represents the same in front elevation.
Figure 11:
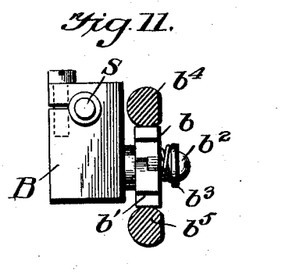
Fig. 11 represents a similar view of the parts shown in Fig. 10 with the shifting-rods turned.

For the purpose of returning the carriage to its initial position or shifting it backward the rods $b^4$ and $b^5$ are made rotatable around their horizontal axes and are provided with the pinions $b^{14}$ and $b^{15}$, respectively. These pinions $b^{14}$ and $b^{15}$ engage teeth upon the upper and lower faces, respectively, of a rack $b^{16}$, which normally abuts against a rod $c$, carried by a plunger $c'$ of a magnet C, preferably of the iron-clad pot-magnet type, substantially as shown in the patent application, Serial No. 19,070, above referred to. It will therefore be seen from Figs. 5 and 7 that when the magnet C is energized and draws in its plunger this will push the rack $b^{16}$ forward and rotate the pinions $b^{14}$ and $b^{15}$ in the direction of the arrows indicated in Fig. 7, which will accordingly rotate the shifting rods $b^4$ and $b^5$ from the position shown in Fig. 10 to that shown in Fig. 11, from which it will be seen that the teeth of the said rods will be rotated clear of the pawls $b$ and $b'$, bringing the latter into engagement with the smooth portion of the rods $b^4$ and $b^5$. At such times as this takes place there will be nothing to hold the carriage in a fixed position, and hence it may then be returned to its initial position or shifted backward to any desired extent. For the purpose of imparting this backward movement to the carriage a strap, chain, or other flexible device D is connected to the carriage, as shown at $d$, Fig. 5, and passes around a wheel D', containing a spring $d'$, secured at one end to the wheel and at the other to a screw $d^2$, upon which the said wheel D' is loosely mounted, so that when the carriage is shifted forward or to the right the spring of the wheel D' will be wound up, and when the pawls $b$ and $b'$ are released from engagement with the teeth of the shifting rods, as described, the tension of the spring $d'$ will pull the carriage back to its initial position or to the beginning of a new line.

The carriage in coming back will do so with more or less force and would ordinarily have a tendency to rebound to a certain extent. To prevent this, a latch E is pivoted to the stop $e$, adjustably secured to the frame of the machine, and so situated that when the carriage returns to the end of its travel it strikes the upper end of the said latch and throws the lip $e'$ upward into engagement with the upright $a^9$ or other stop on the carriage-bar, and thus prevents the said carriage from rebounding. The said latch is so mounted that its lip $e'$ will drop out of engagement with the stop on the carriage as soon as the latter starts to space up, and thus allow the carriage to move forward again at the proper time. The stop $e$, which limits the backward movement of the carriage, is adjustable by means of the screw $e^2$, so that the travel of the carriage may be varied in accordance with the breadth of the paper used and also in accordance with the margin of the printing desired.

Figures 8, 9:
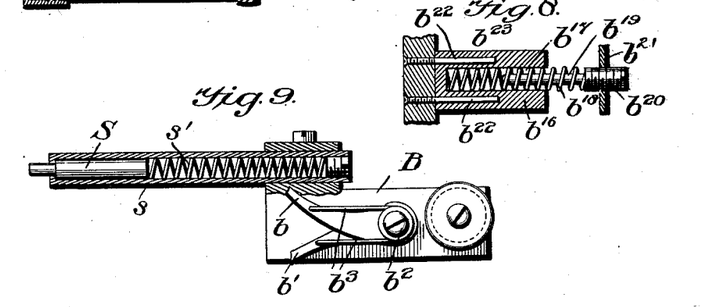
Fig. 8 is an enlarged detail horizontal section through the shifting rack operated by the said carriage release and return magnet.
Fig. 9 is an enlarged side elevation, partly in section, of the carriage-shifting pawls and electrical contact-maker.

Referring again to Figs. 7 and 8, it will be seen that the rack $b^{16}$ is provided with a central chamber $b^{17}$. This is for the purpose of receiving a coil-spring $b^{18}$, which surrounds a pin $b^{19}$, made fast to an adjustable screw $b^{20}$, mounted in a bracket $b^{21}$, secured fast to the frame of the printer, and this spring thus holds the said rack into engagement with the rod $c$ of the plunger $c'$ and normally forces the plunger outward with respect to the magnet. The rack $b^{16}$ is held in the proper alinement by means of the pins $b^{22}$, which pass into cavities $b^{23}$ in the said rack. The function of the magnet C will therefore be seen to be to return the carriage to its initial position or to the beginning of a line. This may be done by energizing the said magnet at will at any point in the travel of the carriage.

The characters are printed upon the paper according to the present invention, as in the case of the invention described in the application, Serial No. 19,070, above referred to, by the platen $g$, operated by the printing-magnet G, the said magnet sending the said platen into engagement with the paper and bringing the latter against the characters of the type-wheel at each time the said magnet is energized, all as fully described in the said application. The type-wheel F, however, in this case is mounted fast upon the shaft $f$ instead of being connected therewith through the medium of a spring, as described in said application, though, if desired, this type-wheel may be provided with the spring connection. The type-wheel is provided with suitable inking-rollers $f'$, suitably mounted in an adjustable upright $f^2$, secured to the frame of the printer.

H represents the combination commutator or device, mounted loosely upon the shaft $f$ and adjustably secured by the thumb-nut $h'$ to the upright $h^2$. This combination-commutator H is of substantially the same structure as that shown and described in the said patent application above referred to and is provided with the trailers or brushes $h^3$, $h^4$, and $h^5$, which pass over the sections $h^6$, $h^7$, and $h^8$, respectively, of said commutator. All of said trailers are mounted upon a block of insulation $h^9$, carried by an arm $h^{10}$, mounted fast upon the shaft $f$. This shaft $f$ may be driven in any suitable manner.

J, K, L, M, and N represent distributing-relays by which currents are distributed to the various electromagnetic parts of the printer at such times as certain prearranged signals are combined by the combination device H, as described in the said patent application above referred to and as will hereinafter more fully appear.

Figure 14:
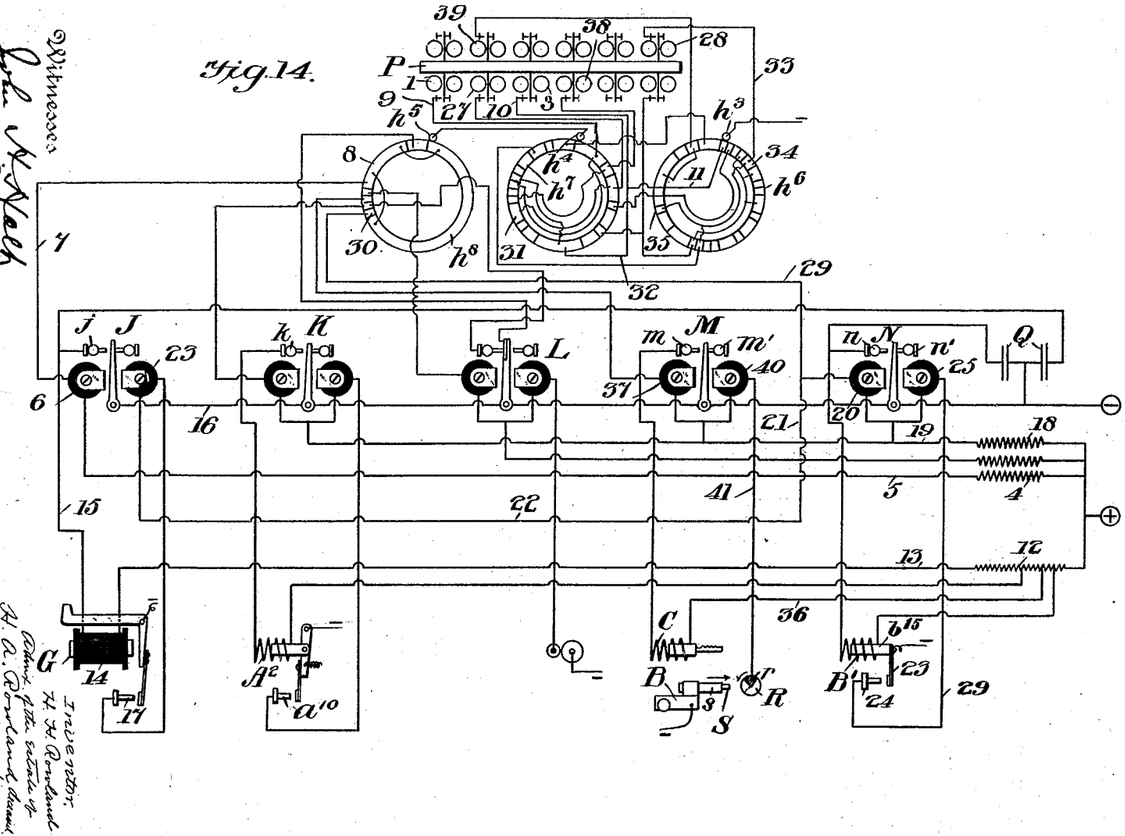
Fig. 14 is a diagram showing the electrical circuits in connection with the printer.

It will be assumed for the purpose of the present description that the printer is operated in connection with a bank of selecting-relays P, and assuming that the signal which it is desired to print is received upon the relays 1 and 3 of this bank the operation of the printer is as follows: The reception of this particular signal, which, it will be assumed, is the letter "x," sends the tongues of the relays 1 and 3 against their forward stops, as fully described in the application above referred to. This action on the part of these relays completes circuits from the plus pole of the local-current supply to the various electromagnetic parts of the printer, which causes the current to flow from the said plus pole as follows: first through the resistance 4 into the wire 5, thence through the coil 6 of the distributing-relay J, and thence into the wire 7, segment 8 of the section $h^8$, and thence into the brush or contact-maker $h^3$, and from said brush to the brush $h^4$, connected thereto, and thence into the segment of the section $h^7$ upon which said brush $h^4$ is resting, and thence by wire 9, connected to said segment, to the forward contact of relay 1. As the tongue of this relay is against its forward stop, current will then pass through the said tongue down the base of the relays to the tongue of the relay 3, and thence into the forward contact of that relay through the wire 10 into the wire 11, and thence into the segment of the section $h^8$ of the combination-commutator which happens at that instant to be under the brush $h^3$, when the current will pass into the said brush and then back to the negative pole of the current-supply. The current passing in this manner energizes the coil 6 of the relay J and sends its tongue against its contact $j$. The current from the positive pole of the local-current supply will then pass through resistance 12 into wire 13, thence through the coil 14 of the printer-magnet G, and thence into the wire 15, through the contact $j$ of the relay J, through the tongue of the said relay, and thence by wire 16 back to the negative pole. The current flowing through this circuit energizes the printer-magnet G and causes it to print the character and at the same time complete the circuit through the contact 17. This circuit may be traced as follows: from the plus pole of the local-current supply through resistance 18, by wire 19 into the coil 20 of the relay N, and from said coil by way of wire 21 into the wire 22, and thence through the coil 23 of the relay J through contact 17 back to the negative pole. The current passing through this circuit causes the tongue of the relay J to be drawn away from its contact $j$, which breaks the circuit through the coils of the printer-magnet G and at the same time energizes the magnet of the relay N, causing it to send the tongue of that relay against the contact $n$. The tongue of the relay N thus engaging with its contact $n$ completes the circuit through the coil of the space-magnet B', causing it to draw in its plunger $b^{13}$ and advance the carriage the distance of one space. At the same time that this plunger is drawn in and advances the carriage the contact 23, carried by the rod $b^5$, as shown most clearly in Fig. 5 and which for simplicity is secured to the plunger $b^{13}$ directly in the diagram Fig. 14, is drawn into contact with the screw 24, and this completes the circuit from the positive pole of the local-current supply through the resistance 18, wire 19, the coil of the magnet 25 of the relay N, wire 26, contacts 23 and 24, and thence back to the negative pole. This causes the relay N to send its tongue against the contact $n'$, and thus break the circuit through the coil of the space-magnet B'. It will therefore be seen that each time a letter is printed the space-magnet will operate and automatically cause the carriage to space up. If it is desired to cause the carriage to space up any number of spaces or to space at will, this is done by throwing the tongue of the space-relay N over against the contact $n$. This may be done in any desired way, or when a person at some distance wishes to have the carriage space up it is usually done by sending a signal for such purpose, this signal being received upon the two relays of the bank of selecting-relays P. Assuming that this signal is received upon the relays indicated 27 and 28, current will pass through the coil 20 of the space-relay by the following circuit: from the plus pole of the local-current supply through the resistance 18, wire 19, the coil 20 of the space-relay, wire 29 to the segment 30, and thence into the contact-brush $h^5$, into the brush $h^4$, and thence into segment 31 and then by wire 32 to the forward contact of the relay 27, then through the tongue of said relay to the tongue of relay 28, and from there through the wire 33 into the segment 34, and from there into the segment 35, through the brush $h^3$, back to the negative pole. This will draw the tongue of the relay N over against its stop $n$ and complete the circuit through the space-magnet B', as above described, and this may be repeated as long as the tongues of the selecting-relays 27 and 28 remain against their forward contacts.

Sparking at the contacts $n$ and $j$ is prevented and the operation of the printer greatly improved by connecting condensers Q across the said contacts and to the negative pole of the local-current supply, as shown in the diagram Fig. 14.

Figure 12:
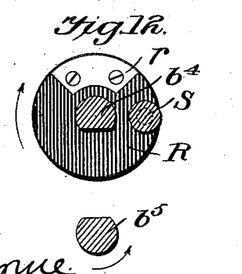
Figs. 12 and 13 are enlarged detail views of the rotatable contact-maker for restoring the carriage-return relay.
Figure 13:
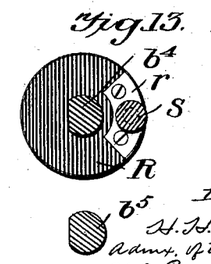

The carriage is sent back at any point in its travel by the releasing mechanism, operated at such times as the magnet C is energized. This is done by throwing the tongue of the relay M against its contact $m$, thus completing a circuit which passes from the positive pole of the local-current supply through a part of resistance 12, through the wire 36, through the coil of the magnet C, contact $m$ of the relay M, through the tongue of said relay back to the negative pole of the current-supply. This causes the said magnet C to draw in its core and release the carriage, as described, allowing it to return to its initial position or back to the beginning of a line. The tongue of the relay M may thus be set against its contact $m$ or electrical connection made between the two in any suitable manner. One way of doing this is to energize the coil 37 of the said relay. If a party at some distant point is operating the printer over a telegraph-line and desires to return the carriage to its initial position, this would be done by the reception of a signal on the selecting-relays P for this purpose. Assuming that this signal is received by the relays indicated 38 and 39, a circuit would be completed through the coil 37 of the said relay M from the plus pole of the local current-supply at such times as the brushes of the combination-commutator comes around upon the segments occupying angular positions corresponding to the segments connected to the coil 37 of the said relay M, as described with reference to the reception of the other signals and as fully described in the patent application above referred to. When, however, the tongue of the relay M is sent against its contact $m$, it is automatically carried back to its back-stop $m'$ when the carriage reaches the limit of its backward travel. This is accomplished by causing the carriage to automatically complete a circuit through the coil of the magnet 40 when the carriage has reached the limit of its backward travel. For this purpose a button of insulating material R is mounted fast upon the shaft $b^4$ and is provided with a metallic contact-plate $r$. When the rod $b^4$ occupies its normal angular position, which will be at such times as the carriage is not being returned to its initial position, the contact-plate $r$ will occupy the angular position indicated in Figs. 12 and 14. When, however, the rod $b^4$ is shifted and the carriage allowed to travel backward to its initial position, the plate $r$ will be shifted to the position shown in Fig. 13. This will throw the said plate into line with a contact-maker, comprising a plunger S, mounted in a tube $s$, secured fast to the plate B, carried by the printer-carriage. This plunger S is normally pushed forward by a coil-spring $s'$, carried within the tube $s$. Therefore when the carriage is sent back to the beginning of a new line or to its initial position the plate $r$ will be shifted to such a position that the plunger S will strike it and complete an electric circuit, which will pass as follows: from the plus pole of the local current through resistance 18, wire 19, to the coil of the magnet 40 of the relay M, and thence by wire 41 to the contact-plate $r$ of the button R into the plunger S and from said plunger back to the negative pole of the current-supply. This will cause the tongue of the relay M to pass over to its back-stop and break the circuit through the coil of the carriage-return magnet C.

K represents the distributing-relay for operating the magnet $A^2$, which, acting through the ratchet-and-pawl mechanism $a^3$, imparts a rotary motion to the shaft $a^2$ and feeds the paper up line by line. When the printer is operated from a distance and it is desired to form a new line, or, in other words, to feed the paper up in the printer, the operator sends a signal for this purpose, which is received upon the relays P, which act through the circuit-combining device upon the relay K and cause the tongue of the said relay to be sent against its contact $k$, which completes the circuit through the coil of the maget $A^2$, which causes the said magnet to operate the lining mechanism. When this magnet acts, it closes a circuit through the contact $a^{10}$, which energizes the right-hand coil of the relay K and causes the tongue to break connection with the contact $k$, which restores the relay K to its normal condition and deënergizes the magnet $A^2$.

The lining mechanism and circuits for operating the same herein shown are fully shown and described in the patent application, Serial No. 19,070, above referred to.

The relay L and its connections operate in conjunction with the blank-paper-feed mechanism also fully shown and described in the patent application above referred to, and forms no immediate part of the present invention, and hence requires no especial description.

Having thus described the said invention, it is obvious that the same is capable of many modifications and changes without departing from the spirit thereof; but

What is claimed, and desired to be secured by Letters Patent of the United States, is—

1. In a printing-machine, the combination with a laterally-movable paper-supporting carriage, of a spacing-rod located near said carriage, means for imparting lateral reciprocating motion to said rod, operative connection between said carriage and said rod, whereby the reciprocating motion of the rod imparts a step-by-step motion to the carriage, means for releasing the operative connection between said carriage and said rod by the operation of said rod, and means for shifting the carriage in a direction opposite to that in which it is sent by said rod.

2. In a printing-machine, the combination with a laterally-movable paper-supporting carriage, of a spacing-rod located near said carriage, an electromagnet for imparting lateral reciprocating motion to said rod, operative connection between said carriage and said rod whereby the reciprocating motion of the rod imparts a step-by-step motion to the carriage, means for rotating the spacing-rod for releasing the operative connection between said carriage and said rod, and means for shifting the carriage in a direction opposite to that in which it is sent by said rod.

3. In a printing-machine, the combination with a laterally-movable paper-supporting carriage, of spacing-rods located near said carriage, means for imparting lateral reciprocating motion to one of said rods, operative connection between said carriage and said rods whereby the reciprocating motion of one of said rods imparts a step-by-step motion to the said carriage, means for releasing the operative connection between the carriage and said rods by the operation of said rods, and means for shifting the carriage in a direction opposite to that in which it was sent by the said rods.

4. In a printing-machine, the combination with a printing mechanism, of a laterally-movable paper-supporting carriage, spacing-rods located near said carriage, means for imparting automatic lateral reciprocating motion to one of said rods after the printing of each character, operative connection between said carriage and said rods whereby the reciprocating motion of one of said rods imparts a step-by-step motion to said carriage, means for rotating said rods for releasing the operative connection between the carriage and said rods and means for shifting the carriage in a direction opposite to that in which it was sent by the said spacing-rods.

5. In a printing-machine, the combination with a laterally-movable paper-supporting carriage, of spacing-rods located near said carriage, an electromagnet for imparting lateral reciprocating motion to one of said rods, means for automatically energizing said magnet, operative connection between said carriage and said rods whereby the reciprocating motion of one of said rods imparts a step-by-step motion to the carriage, means for releasing the operative connection between the carriage and said rods by the operation of said rods, and means for shifting the carriage in a direction opposite to that in which it was sent by the spacing-rods, substantially as described.

6. In a printing-machine, the combination with a laterally-movable paper-supporting carriage, of toothed spacing-rods located near said carriage, means for imparting lateral reciprocating motion to one of said rods, pawls mounted upon said carriage and adapted to engage the teeth of said rods, whereby the reciprocating motion of one of said rods imparts a step-by-step motion to said carriage, means for rotating said rods whereby the teeth thereof are disengaged from said pawls, and means for shifting the carriage in a direction opposite to that in which it was sent by the said spacing-rods after the pawls have been so released.

7. In a printing-machine, the combination with a laterally-movable paper-supporting carriage, of spacing-rods located near said carriage, means for imparting lateral reciprocating motion to one of said rods, operative connection between said carriage and said rods whereby the reciprocating motion of one of said rods imparts a step-by-step motion to said carriage, an electromagnet, an armature operated by said magnet and adapted to rotate said spacing-rods and thereby release the operative connection between the said rods and said carriage, and means for shifting the carriage in a direction opposite to that in which it was sent by the said spacing-rods, substantially as described.

8. In a printing-machine, the combination with a laterally-movable paper-supporting carriage, of toothed spacing-rods located near said carriage, means for imparting lateral reciprocating motion to one of said rods, pawls carried by the said carriage and adapted to engage the teeth of said rods, a pinion carried by each of said rods, a rack engaging both of said pinions, an electromagnet adapted to shift said rack whereby the teeth of said rods are disengaged from said pawls, and means for shifting the carriage in a direction opposite to that in which it is sent by the spacing-rods, substantially as described.

9. In a printing-machine, the combination with a horizontal shaft, of a sleeve adapted to slide on said shaft, a paper-supporting carriage suspended from said sleeve, spacing-rods located near said carriage, means for imparting lateral reciprocating motion to one of said rods, operative connection between said carriage and said rods whereby the reciprocating motion of one of said rods imparts a step-by-step motion to the said carriage, means for releasing the operative connection between said carriage and said rods by the operation of said rods, and means for shifting the said carriage in a direction opposite to that in which it is sent by the said spacing-rods, substantially as described.

10. In a printing-machine, the combination with a horizontal shaft, of a sleeve adapted to slide upon said shaft, a paper-supporting carriage suspended from said sleeve, toothed spacing-rods located near said carriage, means for imparting lateral reciprocating motion to one of said rods, pawls mounted upon said carriage and adapted to engage the teeth of the said rods, means for rotating said rods whereby the teeth thereof are disengaged from said pawls and means for shifting the carriage in a direction opposite to that in which it is sent by the said spacing-rods, substantially as described.

11. In a printing-machine, the combination with a laterally-movable paper-supporting carriage, of toothed spacing-rods located near said carriage, means for imparting lateral reciprocating motion to one of said rods, pawls carried by said carriage and adapted to engage the teeth of said rods, electromagnetically-operated means for rotating said rods whereby the teeth thereof are disengaged from said pawls, an electrical contact carried by one of said rods, and an electrical contact carried by the said carriage, the said contact on the said rod being shifted into alinement with the contact on the said carriage upon the rotation of the said rod and means for shifting the carriage in a direction opposite to that in which it was sent by the said spacing-rods, whereby the electrical contact on the said carriage is brought into engagement with the contact carried by the said rods, an electric circuit completed by the said contacts and a relay operated by the said circuit for restoring the electromagnetic means for rotating the said spacing-rods to its normal position, substantially as described.

12. In a printing-machine, the combination with a laterally-movable paper-supporting carriage, of a spacing-rod located near said carriage, means for imparting lateral reciprocating motion to said rod, operative connection between said carriage and said rod whereby the reciprocating motion of said rod imparts a step-by-step motion to said carriage, means for rotating said rod for releasing the operative connection between said carriage and said rod, a spring-controlled wheel and flexible connection between said wheel and said carriage for shifting the said carriage in a direction opposite to that in which it is sent by the said spacing-rods, substantially as described.

13. In a printing-machine, the combination with a laterally-movable paper-supporting carriage, of toothed spacing-rods located near said carriage, means for imparting lateral reciprocating motion to one of said rods, pawls carried by said carriage and adapted to engage the teeth of said rods, whereby the reciprocating motion of one of said rods imparts a step-by-step motion to said carriage, means for rotating said rods for releasing the pawls from engagement with the teeth of said rods, a spring-controlled wheel and flexible connection from said wheel to said carriage for shifting the said carriage in a direction opposite to that in which it is sent by the said spacing-rods, substantially as described.

14. In a spacing mechanism, the combination with a laterally-movable body, of spacing-rods located near said body, means for imparting lateral reciprocating motion to one of said rods, operative connection between said body and said rods whereby the reciprocating motion of one of said rods imparts a step-by-step motion to said body, means for rotating said rods for releasing the operative connection between said body and said rod and means for shifting the said body in a direction opposite to that in which it is sent by the said rods.

15. In a spacing mechanism, the combination with a laterally-movable body, of spacing-rods located near said body, an electromagnet imparting reciprocating motion to one of said rods, means for automatically energizing said magnet, operative connection between said body and said rods whereby the reciprocating motion of one of said rods imparts a step-by-step motion to said body, means for rotating said rods for releasing the operative connection between said body and said rods, and means for shifting the said body in a direction opposite to that in which it is sent by said spacing-rods.

16. In a spacing mechanism, the combination with a laterally-movable body, of toothed spacing-rods located near said body, means for imparting lateral reciprocating motion to one of said rods, pawls carried by said body and adapted to engage the teeth of said rods whereby the reciprocating motion of one of said rods imparts a step-by-step motion to said body, means for releasing the pawls from engagement with the teeth of said rods by the rotation of said rods, and means for shifting the said body in a direction opposite to that in which it is sent by the said spacing-rods.

17. In a spacing mechanism, the combination with a laterally-movable body, of toothed spacing-rods located near said body, means for imparting lateral reciprocating motion to one of said rods, operative connection between said body and said rods whereby the reciprocating motion of one of said rods imparts a step-by-step motion to the said body, a pinion carried by each of said rods, a rack operatively connected to both of said rods through said pinions, an electromagnet adapted to shift said rack and shift said rods whereby the operative connection between said body and said rods is released, and means for shifting said body in a direction opposite to that in which it is sent by the said spacing-rods.

18. In a spacing mechanism, the combination with a laterally-movable body, of toothed spacing-rods located near said body, means for imparting lateral reciprocating motion to one of said rods, pawls carried by said body and adapted to engage the teeth of said rods, a pinion carried by each of said rods, a rack engaging both of said pinions, an electromagnet adapted to shift the said rack whereby the teeth of said rods are disengaged from said pawls, a spring-controlled wheel and flexible connection from said wheel to said body for shifting the same in a direction opposite to that in which it is sent by the said spacing-rods.

In testimony whereof I affix my signature.

HENRIETTA H. ROWLAND,
*Administratrix of Henry A. Rowland, deceased.*

In presence of—
J. H. KNOWLES,
ANNIE MCFARLAND.